Figure 1:
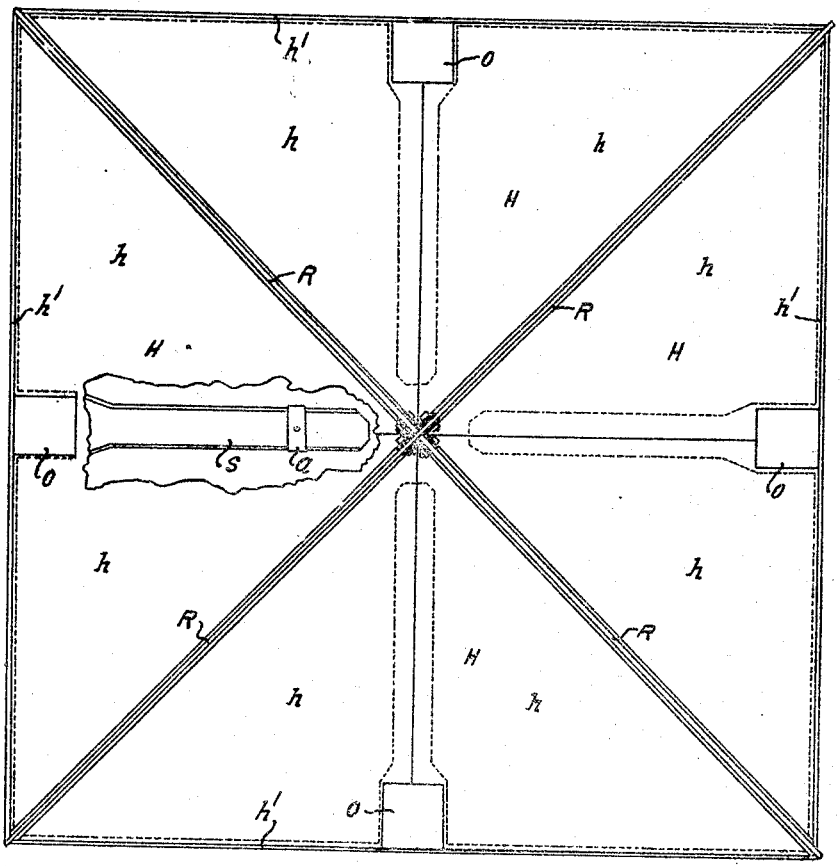

Patented Dec. 8, 1925.

1,565,121

UNITED STATES PATENT OFFICE.

WILLIAM THOMPSON AND WILLIAM REGINALD THOMPSON, OF WEXFORD, IRELAND.

SILO OR BIN FOR THE STORAGE OF GRAIN OR THE LIKE.

Application filed November 26, 1924. Serial No. 752,490.

*To all whom it may concern:*

Be it known that we, WILLIAM THOMPSON and WILLIAM REGINALD THOMPSON, both citizens of the Irish Free State, and residents of Wexford, Ireland, having invented certain new and useful Improvements in or Relating to Silos or Bins for the Storage of Grain or the like (for which we have filed an application for patent in Great Britain dated Nov. 20, 1923, No. 29,263), do hereby declare that the following is a full, clear, and exact description of the same.

This invention relates to silos or bins for the storage of grain or the like and is concerned with the hoppers of or for such silos or bins, and more particularly with hoppers in which the hopper is divided into a plurality of sections each formed with inclined sides and a discharge outlet.

An object of the invention is to prevent the grain or the like from forming a vortex and from being delivered from the top of the bin through the center of the mass and further to provide for drawing off the grain from the bottom so that the discharge may be in the same order in which the grain was filled into the silo or bin. More particularly the invention also has for its object an improved hopper structure in conjunction with spouts.

A further object is to provide an improved construction of such hoppers by which a better regulation than heretofore of the discharge of the grain may be obtained, and by which, if desired, the grain may be re-mixed which, in being filled in, has been more or less separated through the larger and plumper units rolling outwards towards the walls of the bin, while those which were smaller and more misshapen remained in the centre. Hitherto the discharge outlets of such hoppers have been fitted with sliding plates or gates for the purpose of regulating the discharge of the grain or the like. Whilst it may be easy to adjust the slide or gate of a single hopper outlet to deliver say two tons of grain per hour, it becomes practically impossible, when a hopper has four outlets, to adjust and maintain the discharge of each at the rate of precisely one-fourth of two tons per hour, especially when it is borne in mind that an ope of about one-inch super is all that is necessary to deliver one ton of wheat per hour.

With grain having straws or cobs through it equal delivery from a plurality of spouts having "gate" control only is practically impossible.

In accordance with the present invention this disadvantage is avoided preferably by the provision beneath the hopper of inclined spouts adapted to be regulated and by variation of the inclination of which the delivery from the various hopper outlets may be regulated. Thus the several outlets may be left quite open (shut-off slides being provided mainly for safety in case of accident) and yet the inclined spouts underneath these fully-open outlets will only deliver the required quantity for which they are adjusted.

There are therefore secured large hopper outlets which prevent choking from possible obstructions in the grain, together with controllable discharge by means of the adjustable inclined spouts which regulate the speed of delivery according to the steepness or otherwise of their inclination.

In accordance with the further feature of the invention the cross currents of grain which might be caused by an unequal flow of grain into the bin above or an unequal outflow of grain through the outlet are prevented, preferably by the provision of extensions on the ridges between the hoppers so that they extend vertically into the body of the silo and bin to such a height as to act as baffles.

The hopper is preferably composed of metal plates and is of the same shape and area as the body of the silo or bin; it is divided radially into sections or minor hoppers, having deep vertical ridges, each section of which has its own particular outlet.

Each of these outlets, in accordance with the principal feature of the invention, delivers into a spout hinged to the back of the same, and all the spouts are inclined to and discharge into a single central receiver underneath. Each spout is made capable of the most minute adjustment of its inclination or slope in order that the delivery of grain from said spouts may be alike, and in order to maintain or regulate the equal subsidence of the contents of the bin, and to secure the ultimate re-mixing and re-uniting of the light and heavy grain which has become separated in the bin during the process of filling. Preferably all the spouts are connected in such a way that delivery from the bin as a whole may be regulated or stopped.

Figure 2:
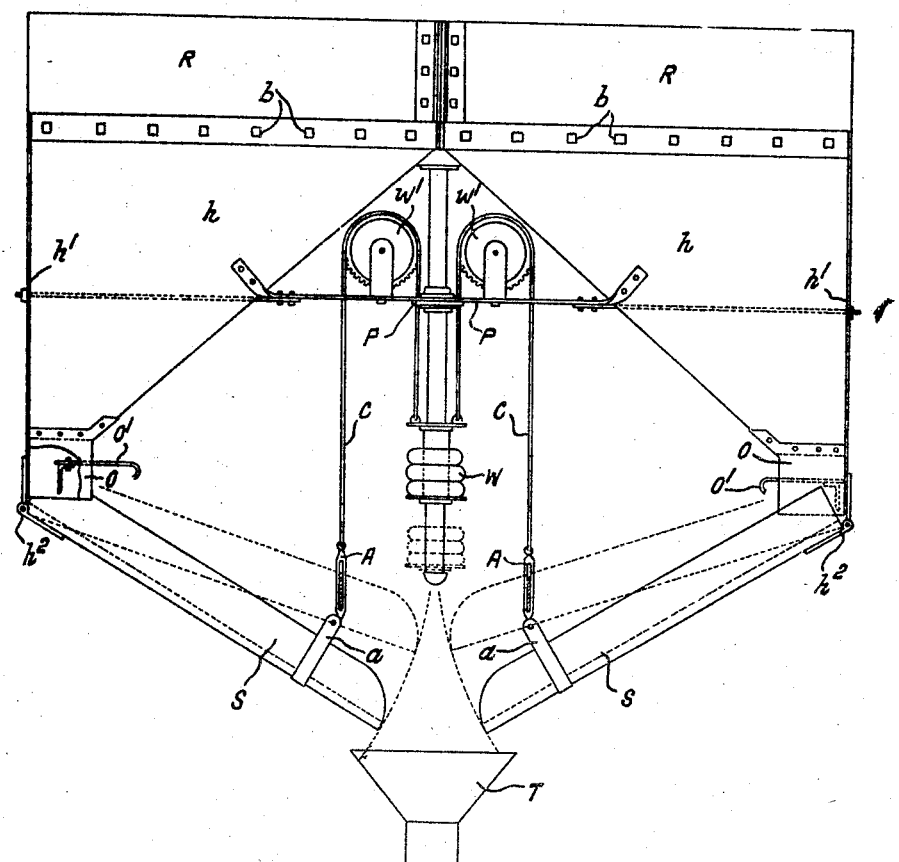

A preferred embodiment of the apparatus of the invention is illustrated in the accompanying drawing, in which Fig. 1 is a plan view and Fig. 2 a sectional elevation of a hopper in accordance with the invention.

Referring to the drawing, the hopper illustrated is composed of four minor hoppers. The two sloping sides of each minor hopper are formed by the plates $h$ and the vertical side of the same by the plate $h^1$. These plates converge to the outlet or mouthpiece O in each case, and each mouthpiece is fitted with a horizontal sliding plate $O^1$ for shutoff purposes. These gates $O^1$ are preferably of L-shape, as shown. R indicates deep radial ridges which divide the said hopper into four equal-sized triangular-shaped minor hoppers, and to which the sloping sides $h$ of the minor hoppers are fitted and secured.

The ridges are preferably made of two plates bolted together for convenience of affixing further vertical extension plates, if desired with very deep bins. The sloping sides of the said minor hoppers $h$ are also bolted or riveted to the vertical plates $h^1$, the said sloping sides being preferably formed of a single plate bent to the required shape to form with such vertical plate a triangular hopper having two sloping sides and one vertical side.

The hopper may, of course, be of any convenient shape to suit the silo or bin for which it is intended and may be divided up into as many minor hoppers as desired, but not less than three, provided that they are divided equally and radially. Square silo bins and hoppers with four minor hoppers are preferable.

The left hand minor hopper (see Fig. 1) is represented as partially cut away in order to show the delivery spout S which receives the grain from the mouth-piece O. Near the end of each spout is fixed a bracket $a$, by means of which the spout may be supported. The spouts S, of which two are shown, are fastened by hinges $h^2$ to the plates $h^1$. All four spouts may be simultaneously raised or lowered by means of a central balance weight W connected by chains C or the like, passing over sprocket wheels $W^1$ or pulleys, with the brackets $a$.

In each chain C is interposed a turnbuckle A or the like, by means of which the relative inclinations of the spouts may be adjusted or equalized. Plates P sustain the sprocket wheels and also act as stays between the minor hoppers.

Where the saving of headroom is an object, we place linings of glass in the delivery spouts, as its superior smoothness allows of flatter slopes to said spouts.

The funnel or receiver T will receive the grain from each of the four equal divisions or sub-hoppers of the hopper, which grain is so equally delivered by means of the adjustable sloping spouts that the mass of grain in the silo or bin is discharged from the bottom direct through the several outlets in the rotation in which it was filled into the silo or bin.

Although we consider the turnbuckle arrangement to be the preferable method of adjusting the inclination of the several delivery spouts, it is obvious that the said spouts could be adjusted by various forms of thrust acting from below, as well as by a pull from above. A cam or wedge might be used, or a screw attached to the spout and acting against any suitable fixture underneath, or a screw fixed underneath and pressing against the spout itself.

Other modified structures may be used to carry out the process of the present invention in which the grain or the like is divided into separate streams which are reunited by the outlet and remixed on discharging. It should therefore be understood that the process claims are not limited to a process carried out in the exact apparatus described in the specific example above but any apparatus capable of performing the same functions may be used.

We claim:

1. A hopper for use in a silo or bin for the storage of grain, said hopper divided by sloping side walls into a plurality of compartments, the side walls of adjacent compartments forming ridges and the ridges of all compartments being disposed about a common center whereby the incoming grain is divided into a plurality of substantially uniform streams, each compartment formed with a discharge outlet in a region sufficiently remote from the ridges and the common center to prevent the formation of a vortex in the grain and spouts disposed beneath said outlets, said spouts hingedly connected with said hopper and directed towards one another so as to deliver beneath the common center.

2. A hopper for use in a silo or bin for the storage of grain, said hopper divided into a plurality of compartments by sloping side walls, the side walls of adjacent compartments forming ridges with all the ridges being disposed about a common center, each compartment formed with a discharge outlet sufficiently remote from the common center to prevent the formation of a vortex in the grain the ridges being formed with upward extensions adapted to act as stream guides within the bin, substantially as and for the purpose described.

3. A hopper for use in a silo or bin for the storage of grain, said hopper divided into a plurality of compartments by sloping side walls, the side walls of adjacent compartments forming ridges, each compartment formed with a discharge outlet in a region sufficiently remote from the ridges to prevent the formation of a vortex in the grain and spouts disposed beneath said outlets, said spouts hingedly connected with said hopper and directed towards one another so as to deliver centrally beneath the hopper and connected together for movement in unison.

4. A hopper for use in a silo or bin for the storage of grain, said hopper divided by sloping side walls into a plurality of compartments, the side walls of adjacent compartments forming ridges and the ridges of all compartments being disposed about a common center, upward extensions to said ridges, said upward extensions terminating at a point short of the top of said hopper, each compartment formed with a discharge outlet in a region sufficiently remote from the ridges and the common center to prevent the formation of a vortex in the grain and spouts disposed beneath said outlets, said spouts hingedly connected with said hopper and directed towards one another so as to deliver beneath the common center.

5. A hopper for use in a silo or bin for the storage of grain, said hopper divided by sloping side walls into a plurality of compartments, the side walls of adjacent compartments forming ridges and the ridges of all the compartments being disposed about a common center, upward extensions to said ridges, said upward extensions terminating at a point short of the top of said hopper, each compartment formed with a discharge outlet in a region sufficiently remote from the ridges and the common center to prevent formation of a vortex in the grain and spouts directed towards one another disposed beneath said outlets, said spouts hingedly connected in such manner that the inclination of the spouts and the rate of delivery of the grain therefrom may be varied.

6. A hopper for use in a silo or bin for the storage of grain, said hopper divided into a plurality of V-section compartments by sloping side walls, the side walls of adjacent compartments forming ridges and the ridges of all the compartments being disposed about a common center, each compartment formed with a discharge outlet sufficiently remote from the common center to prevent the formation of a vortex in the grain, the ridges being extended upwards beyond the body of the hopper so as to act as stream guides within the bin, substantially as and for the purpose described.

7. A hopper for use in a silo or bin for the storage of grain, said hopper divided into a plurality of compartments by sloping side walls sloping downwardly and outwardly, the side walls of adjacent compartments formed with ridges defining valleys and disposed about a common center whereby the incoming grain is divided into a plurality of substantially uniform streams, each compartment formed with a discharge outlet at the outer end of each valley and spouts directed towards one another disposed beneath said outlets, substantially as and for the purpose described.

8. A hopper for use in a silo or bin for the storage of grain, said hopper divided into a plurality of compartments by sloping side walls, the side walls of adjacent compartments forming ridges, each compartment formed with a discharge outlet in a region remote from the ridges and spouts disposed beneath said outlets, said spouts hingedly connected with said hopper and directed towards one another so as to deliver centrally beneath the hopper and a counterbalance with all of said spouts whereby to interrupt simultaneously the flow of grain from said spouts.

In testimony whereof we have signed our names to this specification.

WILLIAM THOMPSON.
WILLIAM REGINALD THOMPSON.